(12) United States Patent
Yamada (10) Patent No.: US 9,816,241 B2
(45) Date of Patent: Nov. 14, 2017

(54) PNEUMATIC FENDER AND MOUTH PIECE METAL FOR PNEUMATIC FENDER

(71) Applicant: The Yokohama Rubber Co., LTD., Minato-ku, Tokyo (JP)

(72) Inventor: Shu Yamada, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/301,190

(22) PCT Filed: Mar. 24, 2015

(86) PCT No.: PCT/JP2015/058951
§ 371 (c)(1),
(2) Date: Sep. 30, 2016

(87) PCT Pub. No.: WO2015/151938
PCT Pub. Date: Oct. 8, 2015

(65) Prior Publication Data
US 2017/0016195 A1    Jan. 19, 2017

(30) Foreign Application Priority Data

Mar. 31, 2014    (JP) .................................. 2014-071326

(51) Int. Cl.
*B60R 19/20*    (2006.01)
*E02B 3/26*    (2006.01)
(Continued)

(52) U.S. Cl.
CPC ................. *E02B 3/26* (2013.01); *B63B 59/02* (2013.01); *F16K 1/00* (2013.01); *F16K 17/02* (2013.01); *B63B 2059/025* (2013.01)

(58) Field of Classification Search
CPC ......... G01L 17/00; B60R 19/20; B63B 59/02; E02B 3/26; F16K 17/04
(Continued)

(56) References Cited

U.S. PATENT DOCUMENTS

| 3,938,840 | A | * | 2/1976 | Haase | ..................... B60R 19/20 188/298 |
| 4,099,759 | A | * | 7/1978 | Kornhauser | ............ B60R 19/20 267/116 |

(Continued)

FOREIGN PATENT DOCUMENTS

| JP | 2000-088690 | 3/2000 |
| JP | 2002-115768 | 4/2002 |

(Continued)

OTHER PUBLICATIONS

International Search Report for International Application No. PCT/JP2015/058951 dated Jun. 16, 2015, 4 pages, Japan.

*Primary Examiner* — Christopher Schwartz
(74) *Attorney, Agent, or Firm* — Thorpe North & Western (57) ABSTRACT

A pneumatic fender and a mouth piece metal for a pneumatic fender with an open/close valve fixed at a position in which a through hole formed in a dividing wall constituting a receiving chamber, where the valve is closed by closed position fixing members. A safety valve is isolated from a cavity of a fender bladder by a receiving chamber, the safety valve being able to be detached and attached while the pneumatic fender is in use. A confirmation test of a valve opening pressure of the safety valve is performed by opening a receiving chamber open/close valve and raising an internal pressure of a cavity of the receiving chamber to a pressure threshold via a receiving chamber communication passage. The open/close valve is fixed at a position in which the through hole is open by open position fixing member.

8 Claims, 8 Drawing Sheets

(51) Int. Cl.
*B63B 59/02* (2006.01)
*F16K 1/00* (2006.01)
*F16K 17/02* (2006.01)

(58) Field of Classification Search
USPC .......... 267/64.21–64.24, 116, 118, 120, 122,
267/123; 293/107, 110, 132, 134;
188/298; 114/219
See application file for complete search history.

(56) References Cited

U.S. PATENT DOCUMENTS

| | | | |
|---|---|---|---|
| 4,176,858 A * | 12/1979 | Kornhauser | B60R 19/20 |
| | | | 280/734 |
| 6,126,214 A * | 10/2000 | Kim | B60R 19/20 |
| | | | 251/76 |
| 9,352,811 B2 * | 5/2016 | Yamada | B63B 59/02 |
| 2013/0076536 A1* | 3/2013 | Nakatani | G08C 17/02 |
| | | | 340/870.02 |
| 2014/0305360 A1 | 10/2014 | Yamada | |
| 2015/0091226 A1* | 4/2015 | Yamada | E02B 3/26 |
| | | | 267/140 |
| 2015/0345092 A1* | 12/2015 | Izumi | E02B 3/26 |
| | | | 114/219 |
| 2016/0083056 A1* | 3/2016 | Sakakibara | E02B 17/003 |
| | | | 114/219 |
| 2017/0022678 A1* | 1/2017 | Yamada | B63B 59/02 |

FOREIGN PATENT DOCUMENTS

| | | |
|---|---|---|
| JP | 2003-129446 | 5/2003 |
| JP | 2013-076609 | 4/2013 |
| WO | WO 2013/046832 | 4/2013 |

\* cited by examiner

PNEUMATIC FENDER AND MOUTH PIECE METAL FOR PNEUMATIC FENDER

TECHNICAL FIELD

The present technology relates to a pneumatic fender and a mouth piece metal for a pneumatic fender, and further relates to a pneumatic fender and a mouth piece metal for a pneumatic fender with significantly enhanced maintainability wherein a safety valve can be detached and attached and a confirmation test of the valve opening pressure of the safety valve can be performed on the pneumatic fender while in use, and the labor and time required for these operations are greatly reduced.

BACKGROUND ART

Pneumatic fenders are designed to have air sealed in the cavity of a fender bladder so as to be provided with predetermined performance such as shock absorbing performance. If the fender bladder remains sealed when the fender is excessively compressed, the internal pressure in the cavity may increase beyond a preset pressure threshold and cause failure of the fender bladder. To combat this, a safety valve that connects the cavity to the outside air may be provided on a mouth piece metal provided on the fender bladder for such cases when the internal pressure of the cavity of the fender bladder exceeds the pressure threshold (see, for example, Japanese Unexamined Patent Application Publication No. 2003-129446A).

Such a safety valve is routinely (for example, every 1 to 3 years) detached from the mouth piece metal for confirmation testing of the value opening pressure, cleaning, and other such maintenance. However, the cavity of the fender bladder of such a pneumatic fender when in use is inflated to a predetermined internal pressure, and so detaching the safety valve from the mouth piece metal of the fender bladder when the pneumatic fender is in use would result in air being violently ejected from the cavity. Thus, such detachment of the safety valve is not possible. Accordingly, the detachment of the safety valve is performed after sufficiently discharging the air from the cavity of the fender bladder. Specifically, to detach the safety valve from the mouth piece metal, the in-use pneumatic fender is brought onto land or a marine vessel before the air is discharged. Upon completion of the confirmation testing of the valve opening pressure, cleaning, and the like of the detached safety valve, the safety valve must be reattached to the mouth piece metal, the cavity of the fender bladder must be inflated with air, and the pneumatic fender must be installed in a predetermined position. Accordingly, the maintenance of detaching and attaching the safety valve to the mouth piece metal requires a great deal of man-hours and time.

SUMMARY

The present technology provides a pneumatic fender and a mouth piece metal for a pneumatic fender with significantly enhanced maintainability wherein a safety valve can be attached and detached and a confirmation test of the valve opening pressure of the safety valve can be performed on the pneumatic fender while in use, and the labor and time required for these operations are greatly reduced.

To achieve the objects described above, a pneumatic fender of the present technology comprises:

a fender bladder including a cylindrical portion and bowl-like hemispherical portions connected to each end of the cylindrical portion;

a mouth piece metal disposed on at least one of the hemispherical portions, the mouth piece metal including:

a safety valve that, upon an internal pressure of a cavity of the fender bladder reaching a pressure threshold, opens to connect the cavity of the fender bladder to outside air and reduce the internal pressure, and a communication passage that connects the cavity of the fender bladder and outside air; and a bladder open/close valve that opens and closes the communication passage; wherein the mouth piece metal further includes:

a receiving chamber that isolates the safety valve from the cavity of the fender bladder, a through hole that connects a cavity of the receiving chamber and the cavity of the fender bladder, the through hole being formed on a dividing wall constituting the receiving chamber, an open/close valve that opens and closes the through hole, a closed position fixing member that fixes the open/close valve at a position in which the through hole is closed, an open position fixing member that fixes the open/close valve at a position in which the through hole is open, a receiving chamber communication passage that connects the cavity of the receiving chamber and outside air, and a receiving chamber open/close valve that opens and closes the receiving chamber communication passage; and the closed position fixing member and the open position fixing member are disposed outside of the receiving chamber at a position to a surface side of the mouth piece metal.

A mouth piece metal for a pneumatic fender of the present technology is a mouth piece metal for a pneumatic fender attachable to a bowl-like hemispherical portion constituting a fender bladder, the mouth piece metal comprising:

a safety valve that, upon an internal pressure of a cavity of the fender bladder reaching a pressure threshold, opens to connect the cavity of the fender bladder to outside air and reduce the internal pressure, and a communication passage that connects the cavity of the fender bladder and outside air; and a bladder open/close valve that opens and closes the communication passage; wherein the mouth piece metal further includes:

a receiving chamber that isolates the safety valve from the cavity of the fender bladder, a through hole that connects a cavity of the receiving chamber and the cavity of the fender bladder, the through hole being formed on a dividing wall constituting the receiving chamber, an open/close valve that opens and closes the through hole, a closed position fixing member that fixes the open/close valve at a position in which the through hole is closed, an open position fixing member that fixes the open/close valve at a position in which the through hole is open, a receiving chamber communication passage that connects the cavity of the receiving chamber and outside air, and a receiving chamber open/close valve that opens and closes the receiving chamber communication passage; and the closed position fixing member and the open position fixing member are disposed outside of the receiving chamber at a position to a surface side of the mouth piece metal.

According to the present technology, the mouth piece metal includes a receiving chamber that isolates the safety valve from the cavity of the fender bladder, a through hole that connects a cavity of the receiving chamber and the cavity of the fender bladder, the through hole being formed on a dividing wall constituting the receiving chamber, an open/close valve that opens and closes the through hole, a closed position fixing member that fixes the open/close valve at a position in which the through hole is closed, an open position fixing member that fixes the open/close valve at a position in which the through hole is open. The closed position fixing member and the open position fixing member are disposed outside of the receiving chamber at a position to a surface side of the mouth piece metal, thus when the open/close valve is fixed at a position in which the through hole is open by the open position fixing member, the cavity of the receiving chamber and the cavity of the fender bladder are connected. Fixing of the open position fixing member can be performed to the surface side of the mouth piece metal, i.e. outside of the fender bladder. In this state, the safety valve functions normally. This enables the safety valve to open, thus reducing the internal pressure of the cavity and preventing damage when the fender bladder is excessively compressed.

When the open/close valve is fixed at a position in which the through hole is closed by the closed position fixing member, the safety valve is isolated from the cavity of the fender bladder. Fixing of the closed position fixing member can be performed to the surface side of the mouth piece metal, i.e. outside of the fender bladder. In this state, the safety valve can be detached and attached from the mouth piece metal of an in-use pneumatic fender while in use without bringing the pneumatic fender onto land or a marine vessel.

The mouth piece metal further includes the receiving chamber communication passage that connects the cavity of the receiving chamber and outside air and the receiving chamber open/close valve that opens and closes the receiving chamber communication passage. This configuration allows the safety valve to be isolated from the cavity of the fender bladder, thus allowing the receiving chamber open/close valve to be opened and the internal pressure of the cavity of the receiving chamber to be raised to the pressure threshold via the receiving chamber communication passage. In other words, a confirmation test of the valve opening pressure of the safety valve can be performed on the pneumatic fender while in use. In such a manner, according to the present technology, the safety valve can be detached and attached and a confirmation test of the value opening pressure can be performed on the pneumatic fender while in use. As such, the labor and time required for these operations can be greatly reduced, and maintainability can be significantly enhanced.

DETAILED DESCRIPTION

Hereinafter, a pneumatic fender and a mouth piece metal for a pneumatic fender of the present technology will be described with reference to embodiments illustrated in the drawings.

A pneumatic fender 1 (hereinafter, also fender 1) of the present technology illustrated in FIG. 1 to FIG. 5 includes a fender bladder 2 that is made mainly of rubber and has reinforcing material embedded therein. The fender bladder 2 is formed with a cylindrical portion 3a and a bowl-like hemispherical portion 3b on each end of the cylindrical portion 3a in the cylinder axial direction connected thereto.

Figure 1:
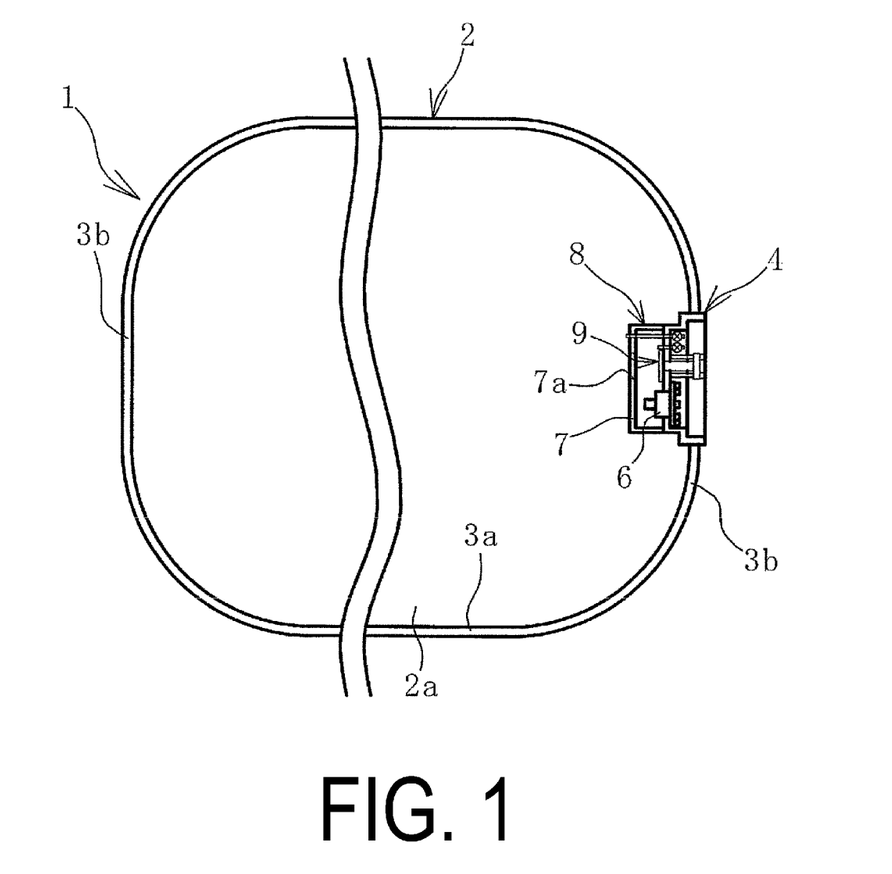
FIG. 1 is an overall schematic view illustrating a pneumatic fender of the present technology as viewed in a vertical cross-section.

A mouth piece metal 4 of the present technology is provided on one of the hemispherical portions 3b. The mouth piece metal 4 may also be provided on the hemispherical portion 3b on both sides. The mouth piece metal 4 is a recessed cylinder-like fitting. The opening of the mouth piece metal 4 to the surface side may be covered by a lid attached by a bolt or the like.

Figure 2:
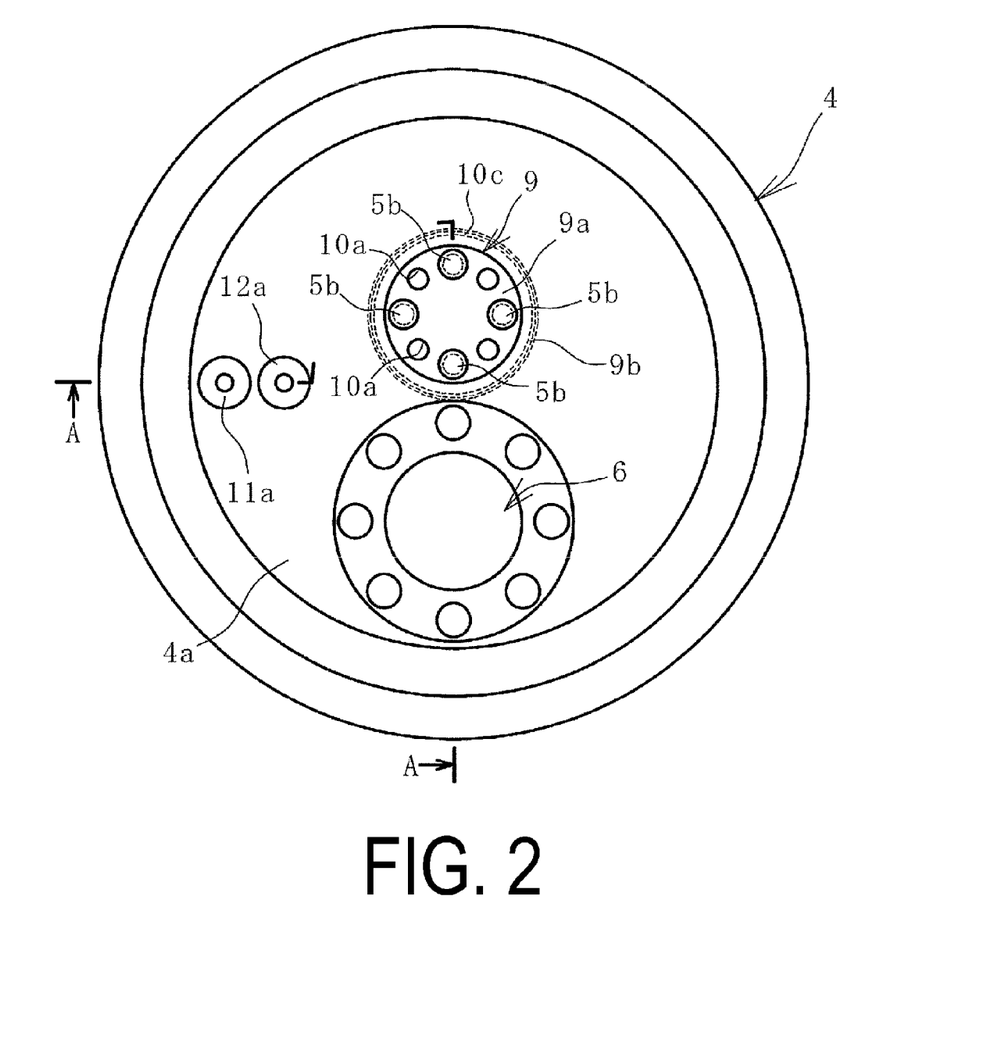
FIG. 2 is a plan view illustrating the area around a mouth piece metal of the present technology illustrated in FIG. 1.
Figure 3:
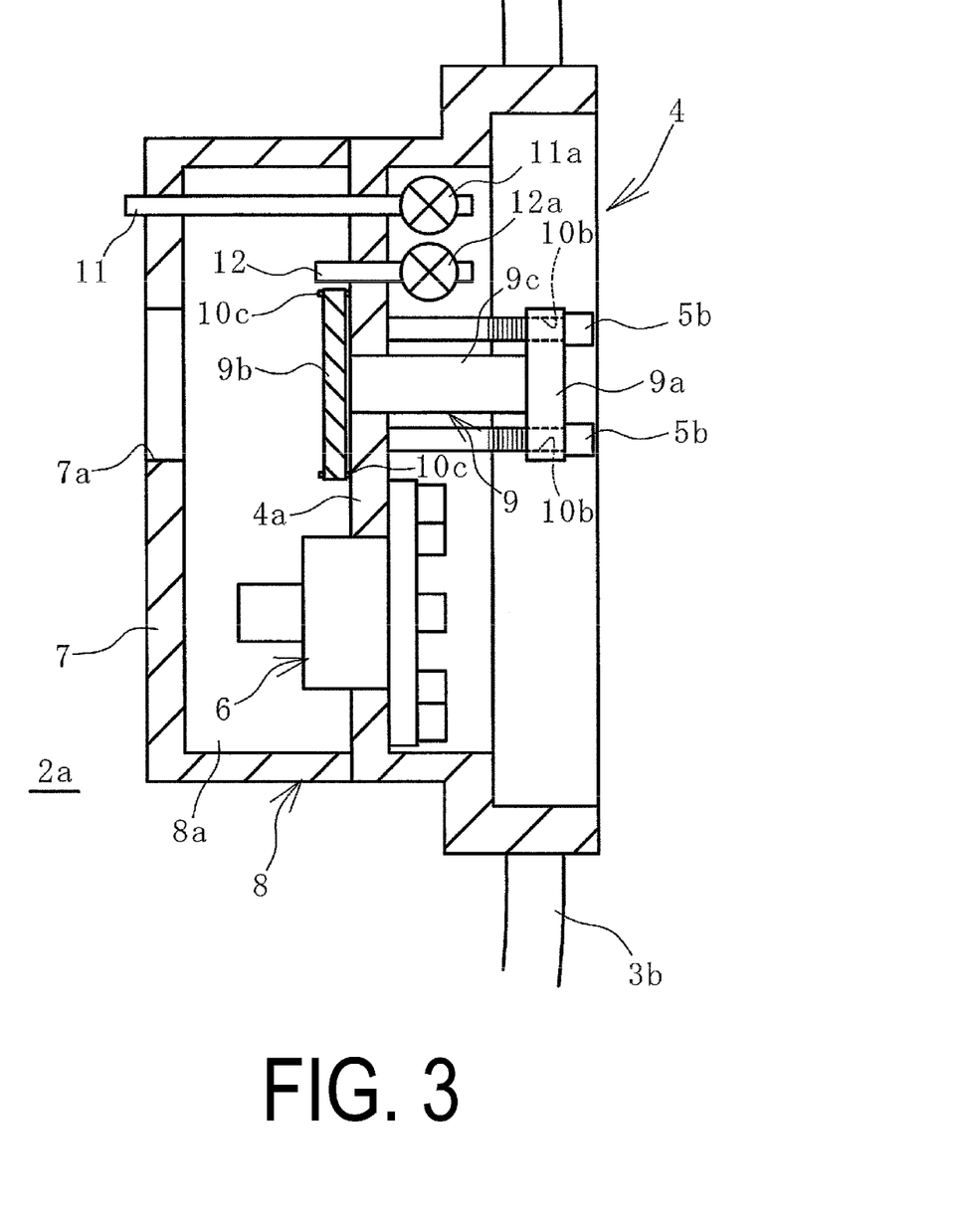
FIG. 3 is an explanatory drawing illustrating an internal structure of the mouth piece metal when viewed in a cross-section taken along A-A of FIG. 2.

The mouth piece metal 4 includes a safety valve 6, a communication passage 11 that connects a cavity 2a of the fender bladder 2 to the outside air, and a bladder open/close valve 11a that opens and closes the communication passage 11. Additionally, the mouth piece metal 4 includes a receiving chamber 8 that isolates the safety valve 6 from the cavity 2a, a through hole 7a formed in a dividing wall 7 constituting the receiving chamber 8, an open/close valve 9 that opens and closes the through hole 7a, a receiving chamber communication passage 12 that connects a cavity 8a of the receiving chamber 8 to the outside air, and a receiving chamber open/close valve 12a that opens and closes the receiving chamber communication passage 12. The mouth piece metal 4 further includes closed position fixing members 5a and open position fixing members 5b.

The receiving chamber 8 is formed extending toward the cavity 2a of the fender bladder 2 from a flat plate 4a on which the safety valve 6 is attached. In other words, the receiving chamber 8 is formed at a position to the back side of the mouth piece metal 4. The safety valve 6 is fixed to the flat plate 4a and extends through the flat plate 4a and into the cavity 8a of the receiving chamber 8. The communication passage 11 extends through the flat plate 4a and the receiving chamber 8 and terminates in the cavity 2a. The receiving chamber communication passage 12 extends through the flat plate 4a and terminates in the cavity 8a of the receiving chamber 8.

The safety valve 6 opens when the pressure reaches a set pressure threshold Pm so that the fender bladder 2 is not damaged when excessively compressed and is closed when the pressure is less than the pressure threshold Pm. In other words, the safety valve 6 opens to connect the cavity 2a to the outside air when the internal pressure P of the cavity 2a of the fender bladder 2 reaches the pressure threshold Pm.

The open/close valve 9 includes a shaft 9c and an outer flange 9a and an inner flange 9b fixed to either end of the shaft 9c. The outer flange 9a and the inner flange 9b are in an opposing configuration. The shaft 9c extends through the flat plate 4a and can slide freely in the cylinder axial direction of the fender bladder 2. The inner flange 9b is disposed in the cavity 8a of the receiving chamber 8. The outer flange 9a is disposed outside of the receiving chamber 8 at a position to the surface side of the mouth piece metal 4. The open/close valve 9 can slide freely in the direction in which it moves towards and away from the through hole 7a.

In FIGS. 1 to 3, the through hole 7a is open with the open/close valve 9 being fixed to the flat plate 4a at a position in which the through hole 7a is open by the open position fixing members 5b. The open position fixing members 5b are disposed outside of the receiving chamber 8 at a position to the surface side of the mouth piece metal 4. In this state, the opposing surfaces of the inner flange 9b and the flat plate 4a are in hermetic contact. A seal material 10c is preferably disposed between the opposing surfaces to increase hermeticity. The seal material 10c is annular.

Figure 4:
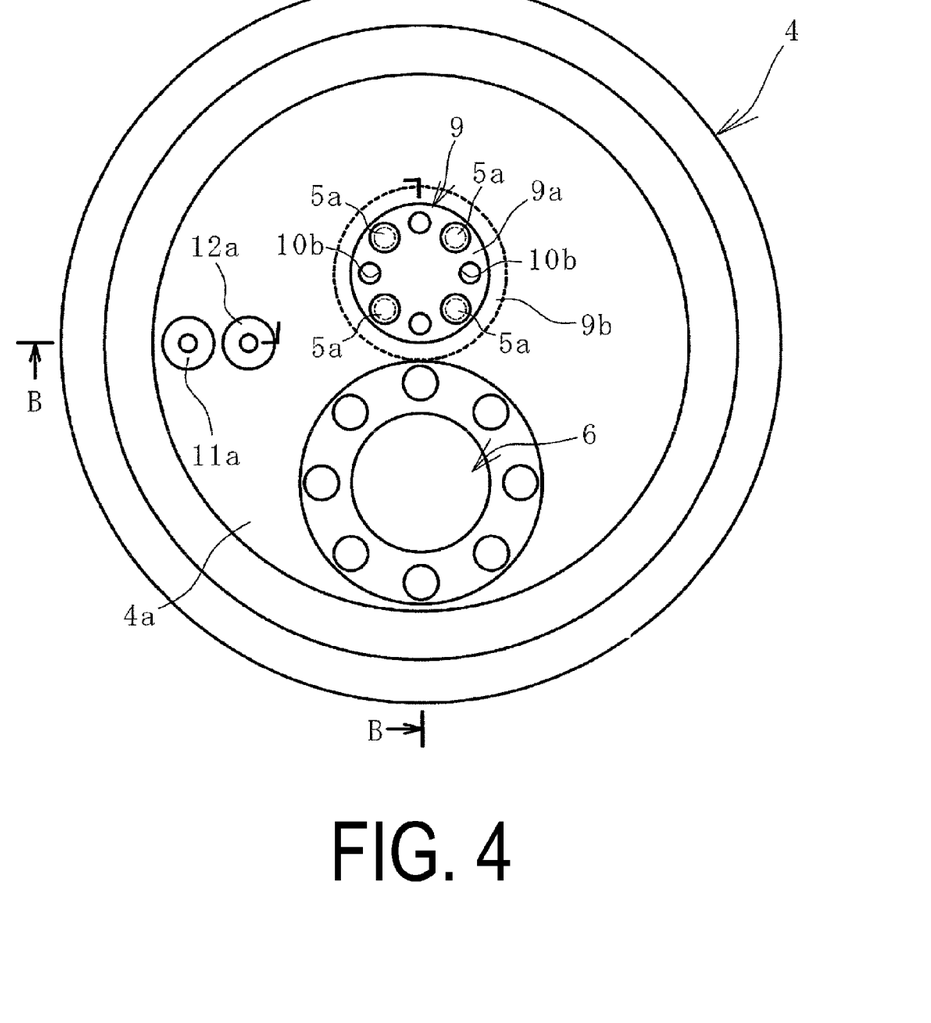
FIG. 4 is an explanatory drawing illustrating the area around the mouth piece metal when a through hole is closed as viewed in plain view.
Figure 5:
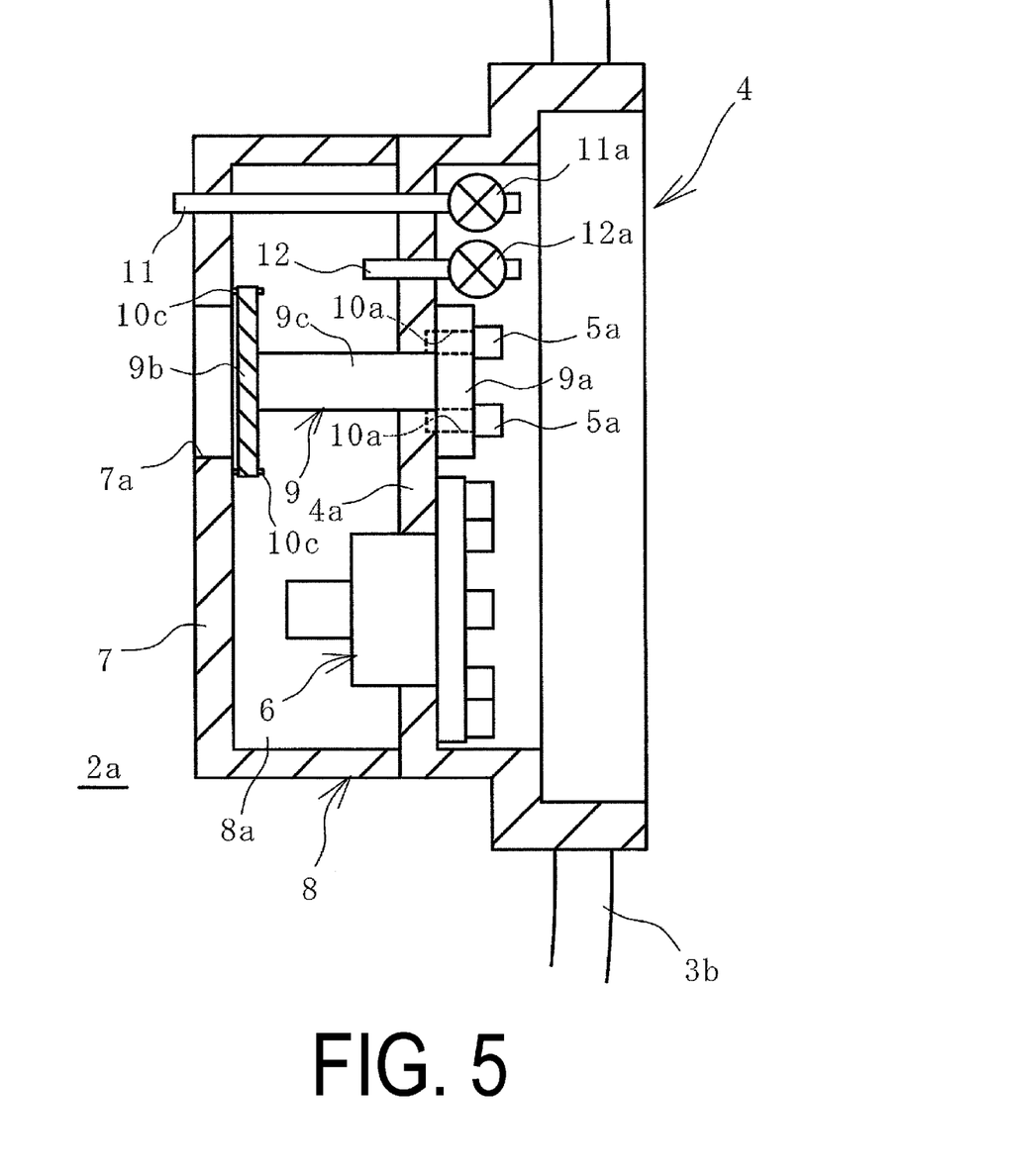
FIG. 5 is an explanatory drawing illustrating the internal structure of the mouth piece metal when viewed in a cross-section taken along B-B of FIG. 4.

In FIG. 4 and FIG. 5, the through hole 7a is closed with the open/close valve 9 being fixed to the flat plate 4a at a position in which the through hole 7a is closed by the closed position fixing members 5a. The closed position fixing members 5a are disposed outside of the receiving chamber 8 at a position to the surface side of the mouth piece metal 4. In this state, the opposing surfaces of the inner flange 9b and the dividing wall 7 are in hermetic contact. The seal material 10c is preferably disposed between the opposing surfaces to increase hermeticity.

Closing position holes 10a and opening position holes 10b are alternately disposed in the outer flange 9a at intervals in the circumferential direction. The closing position holes 10a and the opening position holes 10b extend through the outer flange 9a in the sliding direction of the open/close valve 9. The closing position holes 10a are simple through holes and the opening position holes 10b are bolt holes. The closed position fixing members 5a are typical fixing bolts. The open position fixing members 5b are fixing bolts threaded from the bolt head portion about halfway down in the longitudinal direction.

As illustrated in FIG. 3, to keep the through hole 7a open, the open position fixing members 5b are screwed into the opening position holes 10b formed in the outer flange 9a, the tips of the open position fixing members 5b are brought into contact with the surface of the flat plate 4a, and the opposing surfaces of the inner flange 9b and the flat plate 4a are brought into hermetic contact.

As illustrated in FIG. 5, to keep the through hole 7a closed, the closed position fixing members 5a are inserted in the closing position holes 10a formed in the outer flange 9a, the tips of the closed position fixing members 5a are screwed into bolt holes formed in the surface of the flat plate 4a, and the inner flange 9b and the dividing wall 7 (the dividing wall 7 positioned opposing the flat plate 4a) are brought into hermetic contact.

When the pneumatic fender 1 is used, the cavity 2a is given the predetermined initial internal pressure Pi by being inflated with air or filled with air and fluid (water). In this state, the pneumatic fender 1 is disposed at the place of use such as a wharf. Then, as illustrated in FIG. 3, the open/close valve 9 is fixed at a position in which the through hole 7a is open by the open position fixing members 5b. Accordingly, the cavity 2a of the fender bladder 2 and the cavity 8a of the receiving chamber 8 are connected via the through hole 7a and thus the cavities 2a, 8a become equal in internal pressure P.

When the fender bladder 2 is compressed in this state and the internal pressure P of the cavity 2a exceeds the pressure threshold Pm, the internal pressure of the cavity 8a is also exceeded. This causes the safety valve 6 to open. Thus, when the internal pressure P of the cavity 2a exceeds the pressure threshold Pm by the fender bladder 2 being excessively compressed in such a manner, the safety valve 6 functions as per convention to connect the cavity 2a to the outside air, thus reducing the internal pressure P of the cavity 2a to the pressure threshold Pm or less. As a result, damage to the fender bladder 2 can be prevented.

As illustrated in FIG. 5, when maintenance is performed on the safety valve 6, the open/close valve 9 is fixed at a position in which the through hole 7a is closed by the closed position fixing members 5a. The safety valve 6 is isolated from the cavity 2a of the fender bladder 2 by the receiving chamber 8. Accordingly, the safety valve 6 can be safely detached from the mouth piece metal 4 and safely attached to the mouth piece metal 4. Thus, the safety valve 6 can be detached and attached from an in-use pneumatic fender 1 while in use without bringing the pneumatic fender 1 onto land or a marine vessel.

Additionally, with the open/close valve 9 thus keeping the through hole 7a closed, by opening the receiving chamber open/close valve 12a and injecting compressed air into the cavity 8a of the receiving chamber 8 via the receiving chamber communication passage 12, the internal pressure of the cavity 8a can be raised to the pressure threshold Pm. In other words, a confirmation test of the valve opening pressure of the safety valve 6 can be performed on the pneumatic fender 1 while in use. In such a manner, according to the present technology, the safety valve 6 can be detached and attached and a confirmation test of the valve opening pressure can be performed on the pneumatic fender 1 while in use. As such, the labor and time required for these operations can be greatly reduced, and maintainability can be significantly enhanced.

Figure 6:
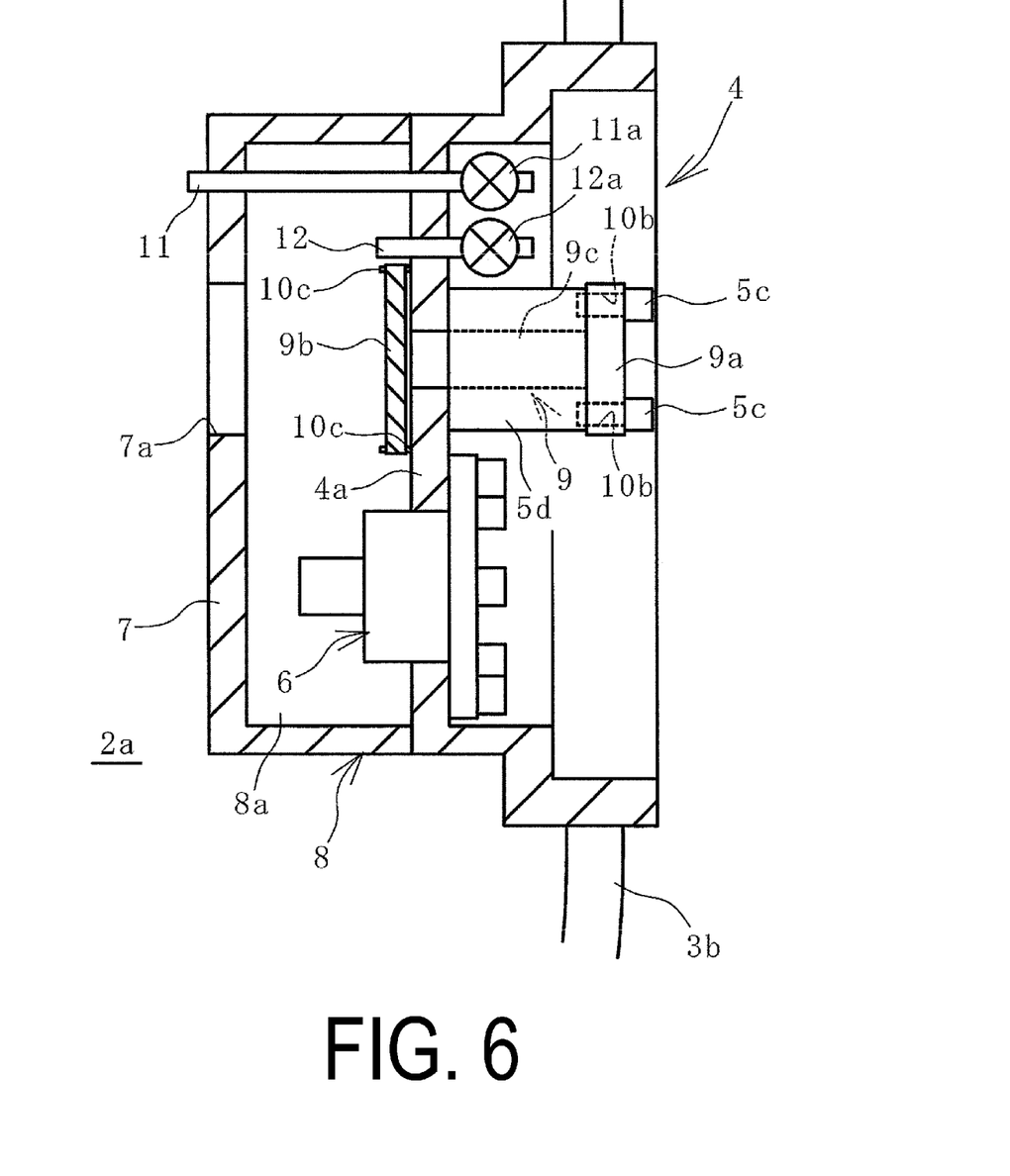
FIG. 6 is an explanatory drawing illustrating a mouth piece metal of another embodiment of the present technology as viewed in a vertical cross-section.

Another embodiment of the mouth piece metal 4 is illustrated in FIG. 6. This mouth piece metal 4 is provided with open position fixing members 5c, which are typical fixing bolts, and an open position fixing member 5d, which is a spacer disposed between the flat plate 4a and the outer flange 9a. As illustrated in FIG. 6, the open position fixing member 5d is disposed between the flat plate 4a and the outer flange 9a to keep the through hole 7a open. Next, the open position fixing members 5c are screwed into the opening position holes 10b formed in the outer flange 9a, the tips of the open position fixing members 5c are brought into contact with the surface of the open position fixing member 5d, which is a spacer, and the opposing surfaces of the inner flange 9b and the flat plate 4a come into hermetic contact. The mouth piece metal 4 of this embodiments allows the length of the fixing bolts, i.e. the open position fixing members 5c, to be shortened.

Figure 7:
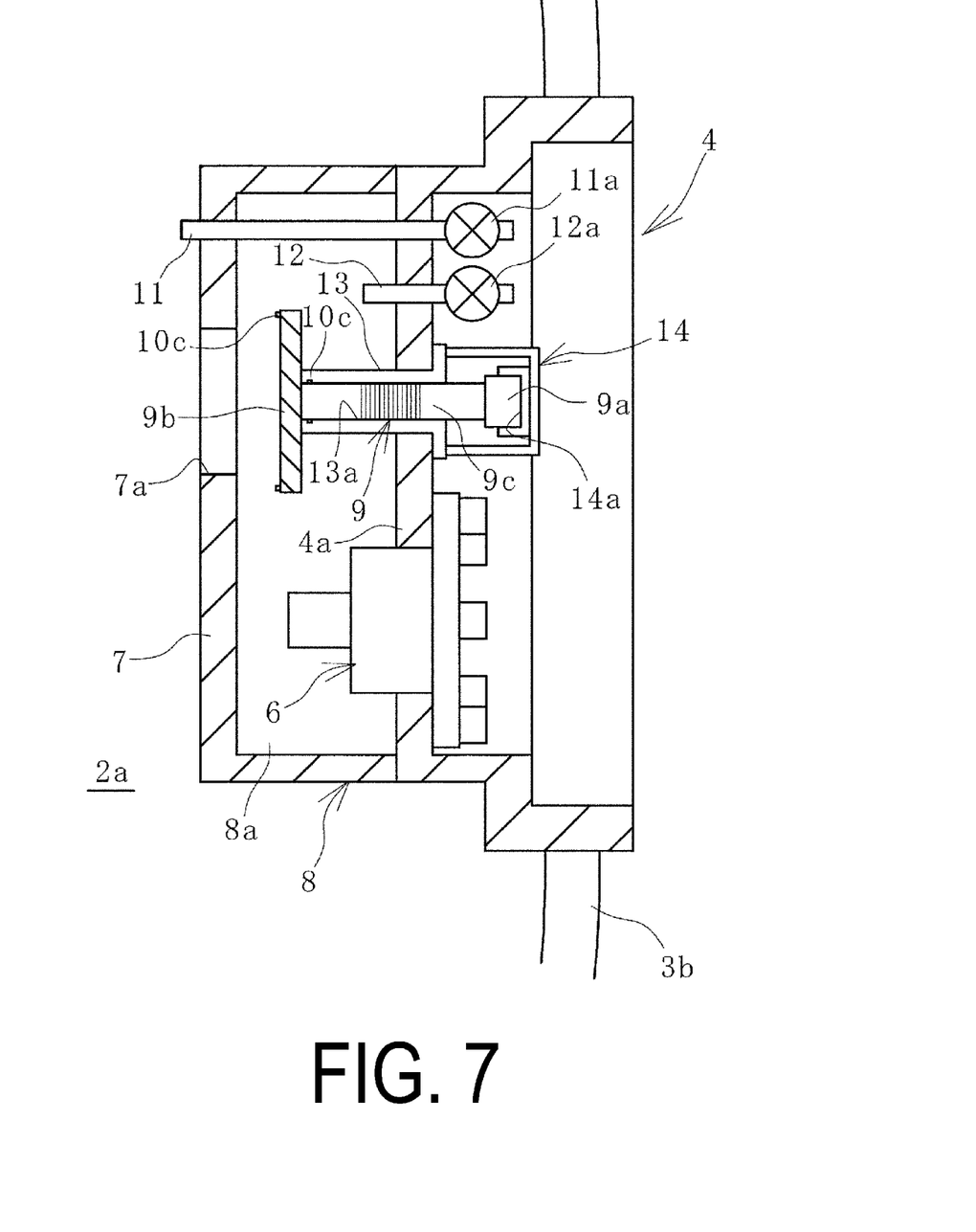
FIG. 7 is an explanatory drawing illustrating a mouth piece metal of yet another embodiment of the present technology as viewed in a vertical cross-section.

Another embodiment of the mouth piece metal 4 is illustrated in FIG. 7. This mouth piece metal 4 is provided with a cylindrical guide member 13 that extends through the flat plate 4a. The guide member 13 includes a first end, with its diameter widened into a flange, fixed to the flat plate 4a. A second end of the guide member 13 extends to a position partway into the cavity 8a of the receiving chamber 8.

A guide hole 13a formed in the guide member 13 extends in the cylinder axial direction of the fender bladder 2. The shaft 9c that constitutes the open/close valve 9 is inserted into the guide hole 13a. The shaft 9c is integrally provided with the outer flange 9a on a first end and the inner flange 9b on a second end. The outer peripheral surface of the shaft 9c and the inner peripheral surface of the guide hole 13a are screwed together, and by rotating the shaft 9c, the inner flange 9b (open/close valve 9) moves toward or away from the through hole 7a. The inner peripheral surface of the guide hole 13a and the outer peripheral surface of the shaft 9c are in contact with each other with the seal material 10c provided in the space therebetween to provide hermeticity.

Furthermore, a cover 14 that covers the outer flange 9a is detachably provided on the first end of the guide member 13. An engagement portion 14a that engages with the outer flange 9a is provided on the inner side of the cover 14. To open the through hole 7a, the cover 14 is removed from the outer flange 9a and the outer flange 9a together with the shaft 9c are rotated, thus moving the inner flange 9b away from the through hole 7a.

The cover 14, which covers the outer flange 9a, prevents any unintentional operation of the open/close valve 9. As illustrated in FIG. 7, when the through hole 7a is closed, the inner flange 9b disposed on the second end of the shaft 9c is brought into contact with the surface of the second end of the guide member 13. In this embodiment, the mating guide member 13 and the shaft 9c function as the open position fixing member.

Figure 8:
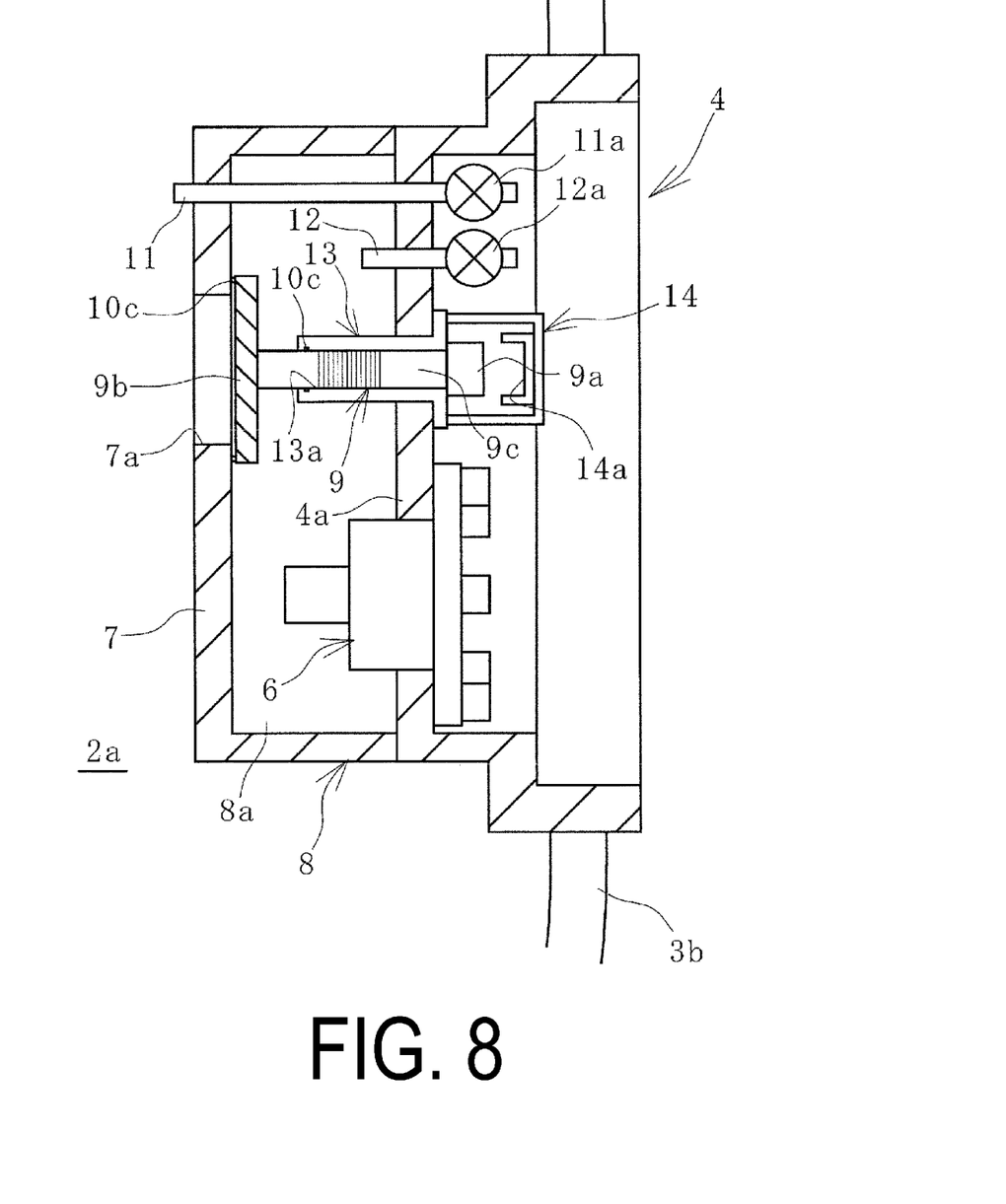
FIG. 8 is an explanatory drawing illustrating the through hole of FIG. 7 in a closed state as viewed in a vertical cross-section.

As illustrated in FIG. 8, to close the through hole 7a, the cover 14 is removed from the outer flange 9a and the outer flange 9a together with the shaft 9c are rotated (the shaft 9c is rotated in the direction opposite to when opening the through hole 7a), thus moving the inner flange 9b (open/close valve 9) toward the through hole 7a. This brings the opposing surfaces of the inner flange 9c and the dividing wall 7 into hermetic contact. As the shaft 9c and the guide hole 13a are screwed together, the open/close valve 9 can be easily fixed at a position in which the through hole 7a is closed. In this embodiment, the mating guide member 13 and the shaft 9c function as the closed position fixing member.

In this embodiment, the stroke length of the open/close valve 9 (distance traveled in the axial direction) required to open and close the through hole 7a can be changed in accordance with the position of the second end of the guide member 13 (the length the guide member 13 extends into the cavity 8a of the receiving chamber 8). Accordingly, the stroke length of the open/close valve 9 can be easily minimized.

The invention claimed is:

1. A pneumatic fender comprising:
a fender bladder including a cylindrical portion and bowl-like hemispherical portions connected to each end of the cylindrical portion;
a mouth piece metal disposed on at least one of the hemispherical portions,
the mouth piece metal including:
a safety valve that, upon an internal pressure of a cavity of the fender bladder reaching a pressure threshold, opens to connect the cavity of the fender bladder to outside air and reduce the internal pressure, and
a communication passage that connects the cavity of the fender bladder and outside air; and
a bladder open/close valve that opens and closes the communication passage; wherein
the mouth piece metal further includes:
a receiving chamber that isolates the safety valve from the cavity of the fender bladder,
a through hole that connects a cavity of the receiving chamber and the cavity of the fender bladder, the through hole being formed on a dividing wall constituting the receiving chamber,
an open/close valve that opens and closes the through hole,
a closed position fixing member that fixes the open/close valve at a position in which the through hole is closed,
an open position fixing member that fixes the open/close valve at a position in which the through hole is open,
a receiving chamber communication passage that connects the cavity of the receiving chamber and outside air, and
a receiving chamber open/close valve that opens and closes the receiving chamber communication passage; and
at least a part of the closed position fixing member and at least a part of the open position fixing member are disposed outside of the receiving chamber at a position to a surface side of the mouth piece metal.

2. The pneumatic fender according to claim 1, wherein the open/close valve includes:
an inner flange disposed in the receiving chamber,
an outer flange disposed outside of the receiving chamber at a position to the surface side of the mouth piece metal, and
a shaft including ends to which the inner flange and the outer flange are fixed in an opposing manner;
the open/close valve is slidable in a direction toward or away from the through hole: and
the open/close valve opens and closes the through hole via the inner flange.

3. The pneumatic fender according to claim 2, wherein
a seal material is disposed between opposing surfaces of the open/close valve fixed at a position in which the through hole is closed and the dividing wall approximate to the through hole, and
a seal material is disposed between opposing surfaces of the open/close valve fixed at a position in which the through hole is open and the dividing wall.

4. The pneumatic fender according to claim 1, wherein
a seal material is disposed between opposing surfaces of the open/close valve fixed at a position in which the through hole is closed and the dividing wall approximate to the through hole, and
a seal material is disposed between opposing surfaces of the open/close valve fixed at a position in which the through hole is open and the dividing wall.

5. A mouth piece metal for a pneumatic fender attachable to a bowl-like hemispherical portion constituting a fender bladder, the mouth piece metal comprising:
a safety valve that, upon an internal pressure of a cavity of the fender bladder reaching a pressure threshold, opens to connect the cavity of the fender bladder to outside air and reduce the internal pressure, and
a communication passage that connects the cavity of the fender bladder and outside air; and
a bladder open/close valve that opens and closes the communication passage; wherein
the mouth piece metal further includes:
a receiving chamber that isolates the safety valve from the cavity of the fender bladder,
a through hole that connects a cavity of the receiving chamber and the cavity of the fender bladder, the through hole being formed on a dividing wall constituting the receiving chamber, an open/close valve that opens and closes the through hole, a closed position fixing member that fixes the open/close valve at a position in which the through hole is closed, an open position fixing member that fixes the open/close valve at a position in which the through hole is open, a receiving chamber communication passage that connects the cavity of the receiving chamber and outside air, and a receiving chamber open/close valve that opens and closes the receiving chamber communication passage; and at least a part of the closed position fixing member and at least a part of the open position fixing member are disposed outside of the receiving chamber at a position to a surface side of the mouth piece metal.

6. The mouth piece metal for a pneumatic fender according to claim 5, wherein the open/close valve includes:

an inner flange disposed in the receiving chamber, an outer flange disposed outside of the receiving chamber at a position to the surface side of the mouth piece metal, and a shaft including ends to which the inner flange and the outer flange are fixed in an opposing manner;

the open/close valve is slidable in a direction toward or away from the through hole; and the open/close valve opens and closes the through hole via the inner flange.

7. The mouth piece metal for a pneumatic fender according to claim 6, wherein a seal material is disposed between opposing surfaces of the open/close valve fixed at a position in which the through hole is closed and the dividing wall approximate to the through hole, and a seal material is disposed between opposing surfaces of the open/close valve fixed at a position in which the through is open and the dividing wall.

8. The mouth piece metal for a pneumatic fender according to claim 5, wherein a seal material is disposed between opposing surfaces of the open/close valve fixed at a position in which the through hole is closed and the dividing wall approximate to the through hole, and a seal material is disposed between opposing surfaces of the open/close valve fixed at a position in which the through is open and the dividing wall.

* * * * *